Oct. 2, 1934. F. STEIN Re. 19,334

DEVICE FOR COPYING ON MACHINE TOOLS

Original Filed Jan. 27, 1928

INVENTOR

Friedrich Stein

BY R. P. Goepel.

ATTORNEY

Reissued Oct. 2, 1934

Re. 19,334

UNITED STATES PATENT OFFICE 19,334

DEVICE FOR COPYING ON MACHINE TOOLS

Friedrich Stein, Heidenheim-on-the-Brenz, Germany, assignor to J. M. Voith, Heidenheim-on-the-Brenz, Wurttemberg, Germany, a copartnership consisting of Walther Voith, Hermann Voith, and Hanna Voith Original No. 1,739,268, dated December 10, 1929, Serial No. 249,867, January 27, 1928. Application for reissue November 18, 1933, Serial No. 698,726. In Germany January 29, 1927

11 Claims. (Cl. 82—14)

Figure 1:
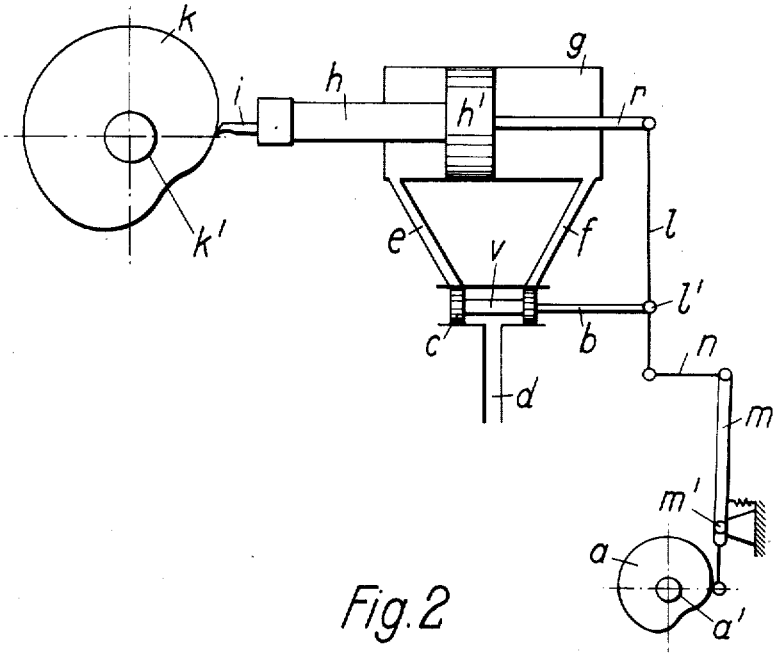

This invention relates to improvements in reproducing mechanism; especially apparatus for making objects according to a design or pattern of especial shape.

An object of the invention is to provide a mechanical reproducing device which is simple in construction, accurate in operation, and designed to reduce the wear on the important parts.

With reproducing apparatus now in use, the enlargement and reduction of the pattern can be obtained only to a restricted extent; hence for each particular size desired, a different pattern has to be employed. Also the pattern is subjected to considerable pressure, and must therefore be made of the best material; and even then its accuracy soon becomes impaired.

It has been further proposed to operate prior reducing devices by electric motors, but with apparatus of this description the speed is necessarily slow and no variation from the dimensions of the pattern is allowed.

With my invention all of these disadvantages are eliminated, without requiring a very complicated machine.

A practical embodiment of my invention is of such a character that the form of the pattern or template is transmitted to the blank or work piece not directly but through the instrumentality of a fluid motor, which generates the principal forces required for operation; the forces exerted on the pattern being relatively small and utilized purely for purposes of control and regulation. Further, enlargement or reduction of the pattern can easily be obtained and different sizes can be produced by the use of patterns having only one size. Various sizes can thus be made from the same pattern, and as the forces to which the patterns are subjected are small, the pattern does not need to be made of the best material. Even when made of inferior materials the patterns do not wear to any marked extent, and the liability to impairment of outline is obviated. Likewise large and heavy parts for the transmission of motion and governing the device are rendered unnecessary.

My invention further comprises the design of a fluid motor which is so built that it can be very easily actuated and controlled by the movement of the pattern, the form of which is being impressed upon the blank or work piece by the cutting tool of the reproducing mechanism.

The other objects and advantages of the invention are set forth in the following description and the novel features are pointed out in the appended claims. The disclosure, however, is illustrative only and I can vary the structural details without departing from the principle of the invention or exceeding the scope or the terms in which the claims are expressed.

On the drawing,—

Figure 1 shows diagrammatically one construction containing my invention; and

Figure 2:
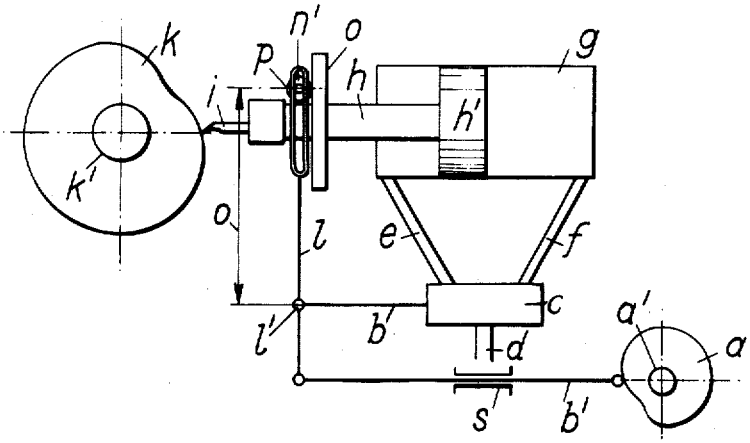

Fig. 2 presents a modification.

The pattern is shown at *a* and it has the form of a cam or disk mounted to rotate upon a shaft *a'*, the work piece or blank *k* being mounted to rotate on a shaft *k'* which turns at the same speed as the shaft *a'*. The blank is engaged by a cutting tool *i* so actuated and controlled that the outline of the pattern *a* is reproduced upon the blank *k*. For this purpose the tool *i* is mounted upon a rod *h* carried by a piston *h'* in a cylinder *g* through which working fluid is admitted by way of passages *e* and *f* communicating with the opposite ends of the cylinder *g*. These passages lead to the casing *c* of the valve *v*, which has the form of a double piston valve bearing two heads. These heads are spaced apart a distance equal to that between the ends of the passages *e* and *f*, and in the position of the valve *v* shown in Fig. 1, the valve closes the two passages *e* and *f*. From the valve *a* projects a rod *b* and from the piston *h'* projects a rod *r*. These two rods *b* and *r* are pivotally connected to a lever *l*, the rod *r* being joined to one end of the lever *l* and the rod *b* being joined to the lever *l* at *l'*, intermediate its ends. The opposite end of this lever is connected by a link *n* to a lever *m* pivoted at *m'*, the end of the lever *m* remote from the link *n* bearing against the periphery of the pattern *a*. At *d* is a supply pipe to lead fluid to the casing *c* of the valve *v*.

In operation, if the pattern *a* is rotating counter-clockwise, when the pattern *a* and work piece are in rotation the pattern moves the lever *m* to actuate the lever *l* and moves the valve *v* so that fluid is admitted to the cylinder *g* on one side or the other of piston *h'* to actuate the cutting tool *i* accordingly. If desired, a spring may be employed to engage the lever *m* in such a way as to make the end of this lever, shown as the lower end in Fig. 1, press constantly against the outline of the pattern *a*. Suppose for example that this pattern is rotating counter-clockwise. If then a point on its periphery of less distance from the center or axis of rotation comes into contact with the end of the lever *m*, the said end of the lever *m* will tend to move closer to the axis of rotation of the shaft *a'*. This movement of the lever *m* will pull the link $n$ to draw out the rod $b$, thus causing the valve $v$ to open the passage $f$ and let fluid flow into the right hand end of the cylinder $g$; at the same time uncovering the passage $e$ to the exhaust. Hence the tool $i$ is forced with greater pressure against the work-piece $k$ to cut it away closer to the axis of $k'$. As the successive radii of the pattern $a$ increase, the lever $l$ is moved in the reverse direction to cause movement of the valve to open the passage $f$ to the exhaust and admit fluid through the passage $e$ to the opposite side of the piston $h'$; thus the tool $i$ is withdrawn and the portions of larger radius of the pattern are thus reproduced upon the blank $k$.

Consequently as the operation of the reproducing mechanism proceeds, the major forces are exerted upon the tool $i$ only, and the forces which are transmitted by the pattern $a$ to the levers are only sufficient to affect the inlet and exhaust of the fluid to the motor. The wear on the pattern is thus slight. Further, by the proper design of levers, any size desired can be obtained for the work piece $k$ without changing the size of the pattern $a$.

Suppose the pattern $a$ turns from right to left with reference to Fig. 1. The first movement of the lever $m$ will pull the rod $b$ out to the right to make the valve $v$ expose the passage $f$, the lever $l$ moving around its end connected to the rod $r$ at this time as a fulcrum. As soon, however, as the piston $h'$ begins to move it tends to swing this lever $l$ around its lower end as a fulcrum and in the reverse direction with the effect of partly closing the passage $f$. Thus the piston $h'$ presses the tool $i$ so as to project it against the work piece $k$ only as far as necessary; and this tool thus actually reproduces the outline of the pattern $a$. Further, as the pattern $a$ brings increasing radii to bear against the end of the lever $m$ so as to move the valve $v$ in the opposite direction, the lever $l$ first moves to the left around its upper end as an axis to carry the valve $b$ to the left, and as soon as fluid begins to flow through the passage $e$ to carry the piston $h'$ to the right, the rod $r$ causes movement of the lever $l$ around its lower end as a pivot to return the valve $v$ and cut down the amount of fluid entering by way of passage $e$; thus the reciprocations of the piston $h'$ are effectually regulated.

In Fig. 2 the piston rod $h$ carries a collar $o$ which is fixed thereon, and surrounding the rod $h$ between the collar $o$ and the tool $i$ is a collar $n'$, which has an opening for an anti-friction element $p$ which bears against the collar $o$. The collar $n'$ is rigid with one end of the lever $l$ pivotally connected at $l'$ to the rod $b$ of the valve in the casing $c$ and $b'$ is a link which slides in a bearing $s$ and is connected to the lower end of the lever $l$. This construction operates in the same manner as the one described above to reciprocate the piston $h'$. The collar $n'$ has a radial slot therein for the roll $p$, and the position of the roll $p$ can be changed in the slot by moving it towards or from the axis of the rod $h$. Hence the distance between the point $l'$ of the lever $l$ and the point where the roll $p$ engages the collar $a$ indicated by the distance $o'$ in Fig. 2, can be changed so as to regulate the size of reproduction at the work piece $k$.

It will be seen that the invention comprises a device for reproducing the contour of a rotatable pattern upon a rotatable work piece in which a tool operates upon the work piece and a motor is operatively connected with the tool. Valve means control the operation of the motor and means are provided for actuating the valve means, which are jointly controlled by the movable pattern and said motor; and that the invention comprises certain other features as an adjustable part operable to increase or decrease the size of the contour reproduced on the work piece relative to the size of the pattern, and other features described hereinabove and finally pointed out in the appended claims.

While I have shown an embodiment of the invention, it will nevertheless be understood that the same is not to be limited to details of form or specific arrangement of the several elements herein described, since the device is obviously susceptible of embodiment in various other alternative structures, and accordingly I reserve the privilege of resorting to all such legitimate changes therein without departing from the spirit of the same, as defined in the appended claims.

I claim:

1. A device for reproducing the contour of a movable pattern upon a movable work piece, comprising a tool for operating upon the work piece, a motor operatively connected with the tool, valve means controlling the operation of said motor, and means jointly controlled by the movable pattern and said motor for actuating said valve means, and including an adjustable part operable to increase or decrease the size of the contour reproduced on the work piece relative to the size of the pattern.

2. A device for reproducing the contour of a movable pattern upon a movable work piece, comprising a tool for operating upon the work piece, a motor operatively connected with the tool, valve means controlling the operation of said motor, and means jointly controlled by the movable pattern and said motor for actuating said valve means and including a lever actuated by the pattern and connected intermediate of its ends to said valve means, and means connecting said lever and a part of the motor whereby said valve means is actuated by the pattern and motor to control the operation of the tool and thereby reproduce the contour of the pattern upon the work piece.

3. A device according to claim 2 having means for adjusting the effective length of said lever to increase or decrease the size of the contour produced on the work piece relative to the size of the pattern.

4. A device for reproducing the contour of a rotatable pattern upon a rotatable work piece, comprising a tool for operating upon the work piece, a motor operatively connected with the tool, and means actuated by the pattern including a lever connected with and operated by part of the motor to thereby control the operation of the tool and reproduce the contour of the pattern upon the work piece.

5. A device for reproducing the contour of a rotatable pattern upon a rotatable work piece, comprising a tool operating upon the work piece, a motor operatively connected with the tool, valve means controlling the operation of said motor, and means connected with the valve means and actuated by the pattern, including a member operatively influenced by a movable part of the motor to control the operation of the tool, and thereby reproduce the contour of the pattern upon the work piece.

6. A device according to claim 5, in which said last named means is provided with means for modifying the effective action thereof to increase or decrease the size of the contour reproduced on the work piece relative to the size of the pattern.

7. A device for reproducing the contour of a rotatable pattern upon a rotatable work piece, comprising a tool, a motor including a cylinder and a piston reciprocating therein and operatively connected with the tool, a valve casing and passages connecting said casing with opposite ends of the cylinder, a valve in said casing, a lever connected at one of its ends to said piston, a valve in said casing connected with said lever intermediate of its ends and controlling the supply of motive fluid to the cylinder, and means actuated by said pattern and operatively connected to the other end of said lever.

8. A device for reproducing the contour of a movable pattern upon a movable work piece, comprising a tool, a motor including a cylinder and a piston reciprocating therein and operatively connected with said tool, a valve casing and passages connecting the same with opposite ends of the cylinder, a valve in said casing controlling the supply of motive fluid to the cylinder, a collar fixed to the piston rod, a collar loosely surrounding the piston rod adjacent to said first named collar, a roller carried by the latter collar and radially adjustable thereon relative to the piston and in contact with the first named collar, a lever connected with the second named collar and with said valve, and a sliding link connected with said lever and actuated by said pattern.

9. A reproducing device, comprising a rotatable pattern, and a rotatable work piece, a tool, a piston carrying a rod on which the tool is mounted, a cylinder containing the piston, a valve casing, the motor having passages leading from the valve casing to the cylinder on opposite sides of the piston, a valve in the casing, a lever, a rod connected to the piston and to one end of said lever, a rod connected to the valve and to the lever between its ends, and a second lever mounted to engage the pattern at one end and having its opposite end connected to the other end of the first named lever.

10. A reproducing device, comprising a movable pattern and a movable work piece, a tool, a piston having a rod carrying the tool, a cylinder containing the piston, a motor having passages to admit fluid to the opposite sides of the piston, a valve casing connected to said passages, the piston having a collar fixed thereon, a collar surrounding the piston rod between the said collar and the tool, said last named collar having a slot containing an adjustable roller, a lever attached to the last named collar, a rod projecting from the valve casing and pivotally connected to the lever between its ends, and a sliding link connected to the lever at its end remote from said piston rod, the link being arranged to bear upon the circumference of the pattern.

11. A device for reproducing the contour of a rotatable pattern upon a rotatable work piece, comprising a tool f r operating upon the work piece, a motor with a movable piston and a piston rod operatively connected with the tool, valve means, including a piston rod controll''ng the operation of said motor, and means jointly controlled by the movable pattern and the piston of said motor for actuating the piston rod of said valve means.

FRIEDRICH STEIN.

CERTIFICATE OF CORRECTION.

Reissue No. 19,334. October 2, 1934.

FRIEDRICH STEIN.

It is hereby certified that the name of the third mentioned member of the assignee copartnership in the above numbered patent was erroneously written and printed as "Hanna Voith" whereas said name should have been written and printed as Hanns Voith, as shown by the records of assignments in this office;; and that the said Letters Patent should be read with this correction therein that the same may conform to the record of the case in the Patent Office.

Signed and sealed this 19th day of March, A. D. 1935.

Leslie Frazer (Seal) Acting Commissioner of Patents.